2 Sheets--Sheet 1.

JOHN B. SLAWSON.

Improvement in Fare-Boxes.

No. 5,789. Reissued March 10, 1874.

*Witnesses:*

T. C. Brecht.

A. McCallum

*Inventor.*

J. B. Slawson by his Atty

P. Hannay

PHOTO-LITHOGRAPHIC Co. N. Y. (OSBORNE'S PROCESS.)

2 Sheets--Sheet 2.

JOHN B. SLAWSON.

Improvement in Fare-Boxes.

No. 5,789. Reissued March 10, 1874.

*Witnesses:*
T. C. Brecht.
A. McCallum

*Inventor:*
J. B. Slawson
by his Atty
P. Hannay

AM. PHOTO-LITHOGRAPHIC Co. N. Y. (OSBORNE'S PROCESS.)

UNITED STATES PATENT OFFICE.

JOHN B. SLAWSON, OF NEW YORK, N. Y.

IMPROVEMENT IN FARE-BOXES.

Specification forming part of Letters Patent 127,808, dated June 11, 1872; reissue No. 5,789, dated March 10, 1874; application filed May 17, 1873.

*To all whom it may concern:*

Be it known that I, JOHN B. SLAWSON, of New York, in the county of New York and State of New York, have invented certain Improvements in Fare-Boxes, of which the following is a specification, reference being had to the accompanying drawings, in which—

Figure 1:
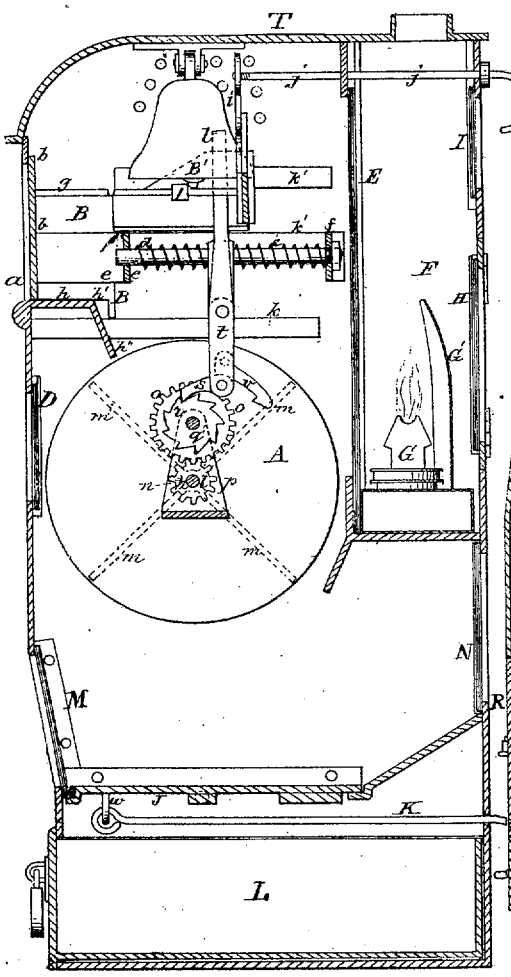
Figure 2:
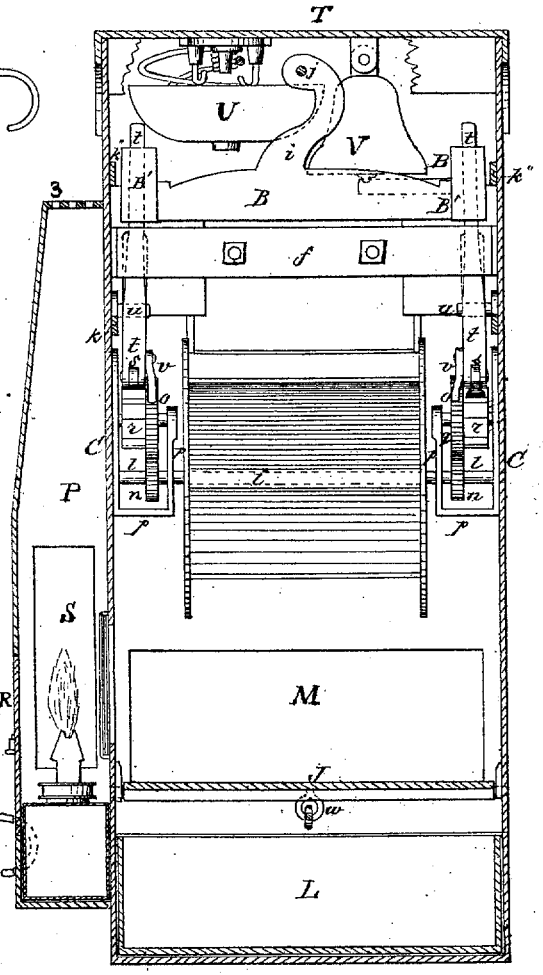
Figure 5:
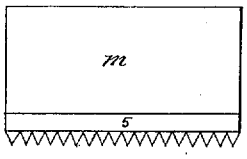
Figure 3:
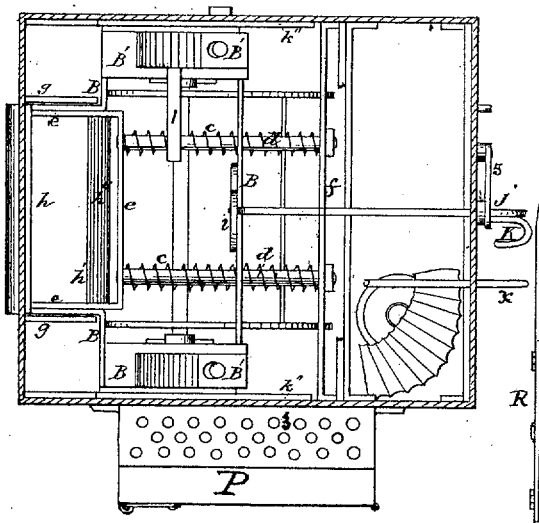

Figure 1 represents a vertical section from front to rear of my improved fare-box, taken near the side of the box on which the side lamp is situated, showing the end of the receiving-wheel and its operating mechanism in elevation; and Fig. 2, a similar view, but taken from side to side immediately in rear of the receiving-wheel, to show the arrangement of the operating mechanism. Fig. 3 represents a plan of the box with the top or cover and inner lamp removed, and Fig. 4 a rear elevation of the box. Fig. 5 represents a plan of one of the partitions or blades of the arrest-wheel, detached to show the serrations of its edge.

My invention relates to that class of fare-boxes in which the passengers, in depositing their fare in the box, are made the instruments of operating the device or devices used for temporarily arresting the fare for inspection, in such manner as to drop it into the general receiving-chamber or money-drawer below, the same device or devices being also used as the means of protecting the fare from felonious abstraction after it has been so deposited.

A box thus constructed and operated is necessarily defective against fraud on the part of the passengers, as any one, two, or more can, by operating the box two or three times rapidly, defraud the proprietors—as, for instance, by first dropping in a spurious ticket or fare, or an insufficient amount, and then instantly operating the box again, which will cause it to pass directly into the drawer below, among the fares previously deposited, and thereby defy identification or detection.

To remedy this defect, and to insure a more perfect inspection of the fare by the driver, and subject in that respect to his own control, are the main objects of this invention; and it consists in combining, with the inspection-chamber, of which the arrest device or devices are operated by the passengers in the act of depositing their fare, a second inspection-chamber and arrest, in which the latter is solely under the control of the driver or conductor, whereby he can leisurely inspect the fare, and afterward deposit it into the third or general receiving chamber or money-drawer below; for which purpose this second inspection-chamber, like the first, is provided with an opening, covered by a transparent medium, through which he may inspect the fare when so arrested, and in connection with which another opening, protected by a similar transparent medium, may be used, through which the passengers can also inspect the fare when so arrested.

To enable others skilled in the art to make, construct, and use my improvement, I will now proceed to describe its parts in detail, as used in connection with devices suitable for carrying the invention into practical effect.

The casing or sides of the box may be made of any suitable material, so long as it possesses sufficient strength, durability, and rigidity to support the operative parts of the box, and the tear and wear incident to such an apparatus.

The box is made in three separate compartments, X, X′, and L, the two first, X and X′, being inspection-chambers, and the latter, L, the general receiving-chamber or money-drawer, into which all the fare, after inspection, is deposited by the driver or conductor. The first two chambers are separated from each other by an arrest, A, which is operated by the passengers successively in the act of paying their fare, in such manner as to cause it to precipitate the fare arrested in the first for inspection into the second chamber X′ for further inspection. Here, for this purpose, it is again temporarily arrested by a second arrest, J, which is arranged to divide the second, X′, from the third or general receiving-chamber L, and which remains under the sole control of the driver or conductor, so that he may take the necessary time to thoroughly inspect it before passing it into the chamber L or money-drawer, should he, by the action of the passengers, have been unable to properly inspect it in the first chamber X, and which, like the second, is provided with an opening, covered by a transparent medium, through which to look to make the necessary inspection; similar openings, also covered by a transparent medium, being provided in both chambers, should it be desired, through which the passengers may also inspect the fare, a more particular description of all of which I will now proceed to give.

In the front of the box—*i. e.*, the side next the passengers, in the upper chamber, X—is formed an opening or gateway, *a*, through which the passengers deposit their fare. This opening is closed by means of a door, *b*, which may either be hinged or made to slide, as represented in the drawings, between the jambs or sides *g* of the doorway *a*, and which, in this connection, form lateral guides for the door, while they also serve to close all ingress to the interior of the box; for which purpose the sill *h* is also extended inward, and afterward deflected downward, as shown in Fig. 1, so as to form a slide or chute, *h''*, for the fare, down which to slide until arrested by, or between the blades *m* of, the arrest A. The inward extension of the sill *h* in a horizontal direction is not so great as the width of the jambs or sides of the door, which are intended to extend as far inward as, or slightly farther than, the backward movement of the door *b*. This backward movement of the door is extended far enough to leave a space between the lower edge of the front of the door and the rear or inner edge *h'* of the sill, of a width sufficient easily to pass the fare down the slide or chute *h''* between the blades *m* of the arrest A. The door *b* for this purpose is secured to a frame, B, which is supported on, and slides back and forth between, guideways *k k' k''* arranged one above the other, and secured to the inner side of the two sides C of the box. To the same sides, but in the rear of the frame B, is secured a cross-piece, *f*, which forms a support for two guide-rods, *d*, and to which they are rigidly secured in any well-known manner—as, for instance, by nut and screw, as represented in the drawing. These rods pass freely through openings made for that purpose in the cross-piece *e*, secured to the sliding frame B. On each rod *d* is arranged a spiral spring, *c*, so as to bear against the rear side of the cross-piece *e* of the sliding door-frame and front side of the stationary cross-beam *f*. By this arrangement, when the door is pushed back by the hand to open the mouth of the box to pay a fare, the spring *c* is compressed between them, so that when released from the pressure of the hand the door, by the reaction of the springs, is again forced back to its original position, thereby closing the mouth of the box, as seen in Figs. 1 and 3. Instead of using two guide-rods, *d*, and springs *c*, only one of each may be employed satisfactorily; but the former mode is deemed preferable. On the stationary cross-bar *f* is erected a standard, *i*, or otherwise secured to it. To the upper end of this standard is secured the inner end of a pull-rod, *j*, the outer end of which is made to project through the rear of the box, within convenient reach of the driver or conductor, for a purpose hereafter to be explained. Immediately below the main frame B and guide-rods *d* of the door *b* is arranged the first arrest, A, consisting of two disks, A', mounted on a shaft, *l*, and connected together by a series of radial blades or partitions, *m*, framed or let into grooves formed in the face of the disks A', or otherwise secured thereto in any known or suitable manner. These blades, in this case, are made of stout glass; but may be made of any other suitable material. The edges of the blades *m* may be made serrated, like a saw, to increase the difficulty of extracting the fare; and, when made of glass, a serrated strip, 5, of metal or other suitable material may be secured to them, instead of notching the glass itself, as seen in Fig. 5. Upon each end of the same shaft *l*, between the disks A' and sides C, are keyed pinions *n*, which mesh into gear-wheels *o*, whose shafts *q* turn in bearings formed in brackets *p*, secured to the sides *c* of the box. Upon each shaft *q* is mounted a ratchet-wheel, *r*, with the teeth of which a pawl, *s*, carried by a lever, *t*, engages. Each of the levers *t* has its fulcrum on a pivotal pin, *u*, secured to the side C of the box. To the side of each lever is riveted or otherwise secured a stop-catch, *v*, which is so constructed and arranged as to engage with a tooth of the gear-wheels *o* each time the door is forced far enough back to unclose the mouth of the box, the object of which is to prevent the wheel A from turning further than is necessary to deposit a fare and prepare it for the reception of another, as will be more fully referred to hereafter.

Instead of using a lever, pawl, and gears on each side, it will be apparent that one set may be dispensed with, but it is deemed better to use the two, as thereby the operations will be performed more regularly than with a single set. The upper ends of the levers are passed through an opening or slot cut in the end pieces B' of the sliding frame B of the door *b*. Thus arranged and combined, as the door *b* is pressed back, its frame B will, at the same time, force back the upper ends of the levers *t* and their lower ends forward, causing them, through the pawls *s*, to turn the ratchet-wheels *r*, and with the latter the gears *o*, which, in turn, impart motion to the wheel A through the pinions *n*, with which they mesh. In this case, there being four blades or partitions, *m*, to the wheel A, the ratchet, gear-wheels, and pinions are so constructed and arranged as to impart to the wheel a motion equal to one-fourth part of a revolution; and so, had there been but three blades, they would have been so made as to have imparted to it a one-third part of a revolution. Again, when the door *b* reaches the end of its backward motion, and, consequently, the upper end of the levers *t*, also, this motion of the latter will have caused the tooth of the stop-catch *v* to engage with a tooth of the pinion *o* arresting it, and through it the further revolution of the wheel A. The arrest of the gear *o* at this time will have brought the next blade *m* into proper position for arresting the next fare, while the forward movement of the door *b*, by the reaction of the springs *c*, will have carried with it the upper end of the levers *t*, thereby releasing the gears *o* from the stop-catch *v*, and leaving the wheel A again free to be turned upon the next backward movement of the door *b*. In the front of the box, opposite the revolving wheel, is arranged a glass light, D, while another, E, is arranged in the rear, both being framed into the box in such manner that they cannot be removed without taking the box apart. These two windows serve the threefold purpose of lighting up the interior of the box, and of allowing the driver and passengers to inspect the fare, and see if any remains between or on the blades of the wheel, and undeposited in the box below. Immediately in rear of the glass plate E is arranged a chamber, F, within which and at one corner is placed a lamp, G, and reflector G′ for lighting up the wheel A, the glass partitions *m* allowing free passage to the fare of the rays of light. To this chamber access is had by means of a door, H, into which is framed a pane of glass, which enables the driver to make his change at night, and to look through the glass partition E into the wheel A, which latter he may also do through a glass-covered opening, I, arranged immediately above. The door is kept closed by means of a hook, *y*, and staple. Immediately below the arrest A another arrest-apron, J, is arranged and pivoted to the sides of the box, to the under side of which is secured an eye-staple, *w*, in which is linked one end of a pull-rod, K, the other end of which projects through the rear of the box, as seen in Fig. 1, within convenient reach of the driver or conductor. Below the arrest J is arranged a drawer, L, into which the fare, when examined in the former, is dropped by the driver. This drawer, as in other fare-boxes, when in use, is kept securely locked, the keys remaining in possession of the proprietor or his authorized agent. Immediately opposite the arrest J, in the front of the box, is arranged an opening, covered or protected by a transparent medium, M, for the convenience of the passengers, through which to examine their fare when dropped upon the arrest-apron J, there being for a similar purpose another opening arranged in the rear, and protected in the same way by a transparent medium, N, for the convenience of the driver or conductor. In this case, the transparent mediums are represented as being made of glass securely framed into the front sides of the box; but, if desired, they may be made of woven wire or other suitable material. On the outside of the box is arranged and secured a lamp-chamber, P, into which is placed a lamp, Q. The bottom and top of the chamber are provided with openings 3—the former for the ingress of air to feed the lamp-flame, and the latter for the escape of the gaseous products of the lamp. In the side of the box next this chamber, a little above or opposite to the arrest J, is arranged a glass-covered opening, W, through which the light is cast upon the apron to light it up at night for the inspection of the fare as it is deposited upon it. Two other windows are made in the lamp-chamber—one in front and the other in rear—the latter, S, to assist the driver to make change, and the former to light up the inside of the car. On the side of this chamber is arranged a door, R, by which access is had to the lamp for trimming, filling, cleaning, &c. To the under side of the cover T of the box is secured a bell, U, to the tongue of which is attached a pull-rod, X, and which is made to project through the rear of the box, within reach of the driver, and by which he calls the attention of the passengers to the payment of their fare. At the side of this bell is arranged another bell, V, which is suspended from the cover T by means of a pivotal pin, *z*. The tongue of this bell is operated upon by a projecting arm, 1, secured to the sliding frame B of the door *b*, in such manner that each time the door is forced back the arm 1 will cause the tongue of the bell V to sound an alarm, and thus notify the driver or conductor that the door *b* has been operated upon and a fare deposited. This bell may be dispensed with, and a lever substituted therefor, by suitably connecting it with the hammer or tongue of the bell U and main frame B.

Figure 4:
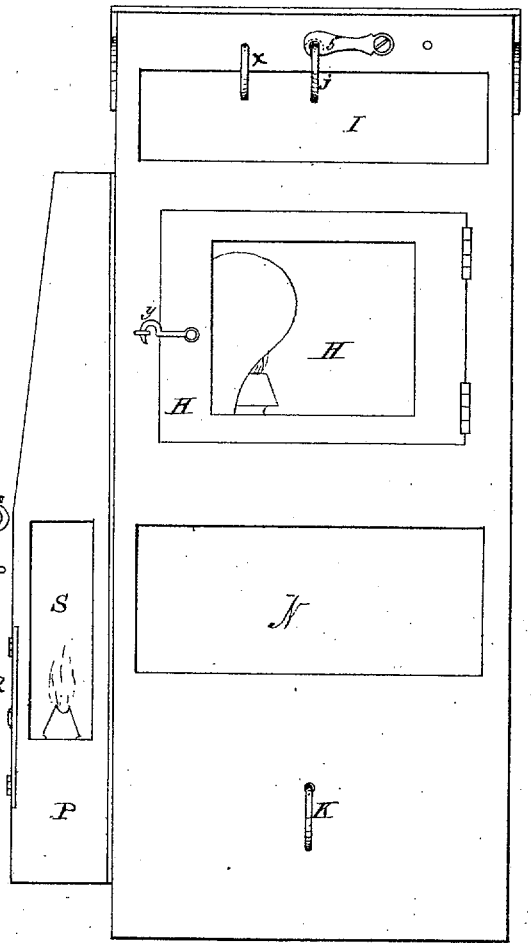

The operation of the box as thus constructed is as follows: The first passenger desiring to pay his fare presses back the door *b* as far as it will go, which will have left an open space between the door and the rear edge *h′* of the horizontal part of the sill *h;* he then deposits his fare, which will descend over the slide *h″*, and by it be guided down upon the first arrest A; this done, he removes his hand, when the door will be again forced forward to its original position by the reaction of the springs *c*, which had, meanwhile, been compressed by the back movement of the door. Here the fare thus deposited remains for inspection until the next passenger pays his fare, which he does by simply going through the same operation, but which will have deposited the first fare upon the second arrest J, below; as, in pushing back the door, the latter will, by its backward movement, have caused the lever *t*, through the pawls *s*, ratchet-wheels *r*, gear-wheels *o*, and pinions *n*, to impart a one-fourth part of a revolution to the arrest A, thereby causing the fare to drop upon the apron J, while, during the interval between payments, the fare may be inspected in chamber X on arrest A. Again, as the door *b* has been pushed back, the arm 1, attached to its sliding frame, will have acted on the lower end of the tongue of the bell V, dragging it back until it slides over its upper edge, thereby imparting a vibratory motion to it, which causes it to sound an alarm on the bell, so as to notify the driver that a fare has been paid. The fare, once on the apron J, is then inspected by the driver or conductor at his leisure through the opening N, it, at that stage, being entirely under his control; when, if satisfied that it is correct, he causes it to drop into the drawer L, by pulling the rod K; otherwise, he calls the attention of the passengers to the fact, and causes the mistake or fraud to be rectified, and which could not be done where the passing of the fare from the arrest A into the drawer L laid under the control of the passengers, as would be the case were the box unprovided with the second inspection-chamber X′ and arrest J, and openings M and N. Another means of effecting this object may be used, which consists in fastening a button, 4, on the rod *j* immediately on the outside of the rear of the box, and using, in connection therewith, a pivoted hook, 5, the hooked end of which (when the driver desires to stop the operation of the upper arrest A in order to examine the fare arrested therein) is made to embrace the rod *j* on the outside of the button 4, as shown in Fig. 4. This arrangement locks the door *b*, preventing it from being pushed back, and, consequently, the further operating of the arrest A. But this device is not deemed so advantageous as that of the second inspection-chamber X′ and arrest J, and will, as a rule, be used more as an adjunct of the latter than alone.

In case the passengers fail to pay their fare promptly on entering the car, the driver calls their attention to the fact by pulling the rod *x*, which causes an alarm to be sounded on the bell V, the rod *x*, for this purpose, being attached at its inner end to the spring-tongue or hammer of the bell. When the last passenger has paid his fare the driver pulls the rod *j*, which draws back the door *b* and operates the first arrest A, thereby depositing it for inspection upon the arrest J below.

A fare-box constructed upon this plan possesses many advantages over a box in which the arrest or arrests are entirely under the control of the passengers for their operation; or over a box in which the driver or conductor has sole control of its operation, as with the same amount of trouble to the latter, it affords him two independent opportunities of verifying the correctness of the fare, and one of these entirely under his own control, while it also serves to isolate each payment of fare from the others, thus avoiding confusion as to the amount paid by each passenger; and for the further reason that a box combines greater security against felonious abstraction of the fare, with a more perfect opportunity of thoroughly inspecting it both by passengers and driver, in which the latter has sole control over one of the arrests, and in which the passengers must operate the other in the act of depositing their fare.

Having thus described my invention, what I claim as new, and desire to secure by Letters Patent, is—

1. The combination, in a fare-box, of three chambers, X, X′, and L, with an arrest, A, to be operated by the passengers through the instrumentality of a self-closing door in the act of depositing their fare, and an arrest, J, to be operated by the driver or conductor, when the intermediate chamber X′ is provided with a transparent medium, N or M, or both, through which the driver or passengers, or both, may inspect the fare when deposited on arrest J, in the manner substantially as and for the purposes set forth.

2. The combination, in a fare-box, of three chambers, X, X′, and L, of an arrest, A, so connected to a self-closing door as to be operated by the passengers in the act of paying their fare, and an arrest, J, to be operated by the driver, when so arranged as to receive the fare as precipitated from arrest A, and of transparent mediums so arranged with relation to the arrests A and J that either the driver or passengers, or both, may examine and inspect the fare upon either or both of the arrests, as set forth.

3. The combination, in a fare-box, of the following instrumentalities, to wit: A mouth or opening, *a*, through which the passengers can deposit their fare in the box; a self-closing door, *b*, to cover the mouth; a wheel, A, provided with two or more blades or aprons, *m*, for the purposes of closing the passage to the lower part of the box, of receiving and arresting the fare when first deposited in the box, and afterward of transferring it below; mechanism, substantially as described, for connecting the self-closing door with the wheel A, in such manner that the opening of the door by one passenger to deposit his fare shall cause the fare of the next preceding passenger, through a partial revolution of the wheel, to be precipitated down into the examining-chamber below; a movable apron, J, solely under the control of the driver or conductor, for the purpose of temporarily arresting the fare so precipitated for examination; and a transparent medium M or N, or both, so arranged that the passengers or driver or conductor may, through such, inspect the fare when arrested, the whole being arranged substantially as set forth.

4. A fare-box consisting of two chambers, communicating with each other by means of a passage-way provided with transparent mediums, when said passage-way is divided so as to form the two compartments by means of an arrest so arranged, in connection with another arrest below, that the fares will be automatically separated and detained singly in the upper compartment for inspection, and may afterward be collected and detained in the lower compartment for further inspection previous to being turned into the drawer, substantially as herein described and shown.

5. In combination with a self-closing door which covers the mouth of a fare-box, and the opening of which operates an arrest-wheel, A, in the manner described, a rod, *j*, button 4, and hooks 5, or their equivalent, for the purpose set forth.

6. A movable arrest, A, when provided with serrations in the manner described, and used, in connection with a fare-box, for the purpose set forth.

Witnesses: J. B. SLAWSON.
P. HANNAY,
D. G. STUART.